United States Patent [19]

Kim

[11] Patent Number: 5,060,055

[45] Date of Patent: Oct. 22, 1991

[54] COLOR DISPLAY CIRCUIT

[75] Inventor: Kang-soo Kim, Kyungsangbuk-do, Rep. of Korea

[73] Assignee: Samsung Electron Devices Co., Ltd., Rep. of Korea

[21] Appl. No.: 461,085

[22] Filed: Jan. 4, 1990

[30] Foreign Application Priority Data

Apr. 4, 1989 [KR] Rep. of Korea ..................... 89-4488

[51] Int. Cl.[5] .......................... G09G 1/28; H04N 9/68

[52] U.S. Cl. ..................................... 358/27; 340/701; 340/703

[58] Field of Search ....................... 358/56, 64, 65, 66, 358/29; 340/701, 703

[56] References Cited

U.S. PATENT DOCUMENTS 4,746,970 5/1988 Hosokawa ........................... 358/29
4,894,653 1/1990 Frankenbach ...................... 340/703
4,929,933 5/1990 McBeath ............................ 340/701

*Primary Examiner*—Howard W. Britton
*Attorney, Agent, or Firm*—Leydig, Voit & Mayer

[57] ABSTRACT

A color display circuit is disclosed which comprises: a video signal input section for receiving color information data, intensity information data, and vertical and horizontal synchronizing signals; a color mode selecting section for selectively outputting color mode selecting signals; a color mode converting section for selecting and outputting the intensity information data; a color selecting section for selecting and outputting the corresponding color signals; a video signal combining section for outputting electron gun controlling signals; an intermediate color forming section for letting the video signal combining section form an intermediate color; and a luminance adjusting section for controlling the levels of the electron gun controlling signals. The circuit of the present invention is capable of operating the 16-color/64-color modes within the same circuit and capable of displaying intermediate colors. Further, the circuit becomes simple.

6 Claims, 7 Drawing Sheets

COLOR DISPLAY CIRCUIT

FIELD OF THE INVENTION

The present invention relates to an improved color display circuit.

BACKGROUND OF THE INVENTION

The color display circuit or the color encoder is a circuit for outputting video signals to output devices such as a color TTL monitor and the like by selecting the corresponding colors in accordance with the color information and/or the intensity information outputted from a computer and the like. Such a color display circuit is illustrated in FIG. 1, and is disclosed in Korean Utility Model Publication No. 85-1954.

The above circuit is constituted such that a color mode converting section 81 is automatically shifted to a 16-color/64-color mode by a color mode selector 82 in accordance with the positive or negative polarity of the vertical synchronizing signals inputted through input terminals C1-C8; and the color information corresponding to the 16-color/64-color mode inputted through the input terminals C1-C8 is supplied to a video signal combining section 83 in order to control the video signal outputt section 84, so that 16 colors or 64 colors are selectively displayed.

The video signal combining section 83 consists of D/A converters D/A1-D/A3 and combiners AD1-AD3, and the respective data of the color information are directly supplied to the combiners AD1-AD3 in the case of a 16-color mode, while, in the case of a 64-color mode, the respective data of the color information are supplied through the D/A converters D/A1-D/A3 to the combiners Ad1-AD3. Meanwhile, in the case of a 16-color mode, a bright color in formed by controlling a brightness adjusting section 85 by means of an intensity information, while, in the case of a 64-color mode, a contrast adjusting section 86 is controlled by the respective color data of the intensity information. Reference numeral 87 represents deflection and high voltage generating section.

However, in such a conventional color display circuit, the circuit system has a dual nature of the 16-color mode and the 64-color mode, and consequently, the constitution of the circuit is very complicated, with the result that the manufacturing cost for it becomes very high, thereby aggravating the economic feature. Further, in its form of the signals used in the circuit, digital and analogue signals are sometimes mixedly used depending on the mode, while the methods of controlling the video signal outputt section are different according to each mode, thereby making the designing of the circuit very troublesome. Further, in the case of a 16-color mode, the differences between the colors are not definite, and particularly, green and yellow colors are not discriminable, thus ultimately showing an insufficiency of color display.

SUMMARY OF THE INVENTION

The present invention is intended to overcome the above described disadvantages of the conventional techniques.

Therefore, it is the object of the present invention to provide a color display circuit in which the color displays are carried out through a single circuit system and in the same form of signals for the cases of different modes so that the constitution and the controlling of the circuit and the signal processing are simpler, and the color display capability is sufficient.

In achieving the above object, the color display circuit according to the present invention comprises:

a video signal input section for receiving data of color information of a predetermined number of bits, data of intensity information for it, and vertical and horizontal synchronizing signals;

a color mode selecting section for selectively outputting color mode selecting signals in accordance with the vertical synchronizing signals which are inputted through the video signal input section;

a color mode converting section for selecting and outputting the intensity information in accordance with the color mode, after being controlled by the color mode selecting signals;

a color selecting section for selecting and outputting the corresponding color signals after receipt of the data of the intensity information from the color mode converting section and the data of the color information through the video signal inputting section;

a video signal combining section for outputting control signals in order to control a plurality of electron guns after D/A conversions of the color signals;

an intermediate color forming section for letting the video signal combining section form an intermediate color upon inputting of an intermediate color information to the video signal input section; and a luminance adjusting section for controlling the level of the control signals which are outputted by the video signal combining section upon inputting of an intensity information to the video signal input section.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
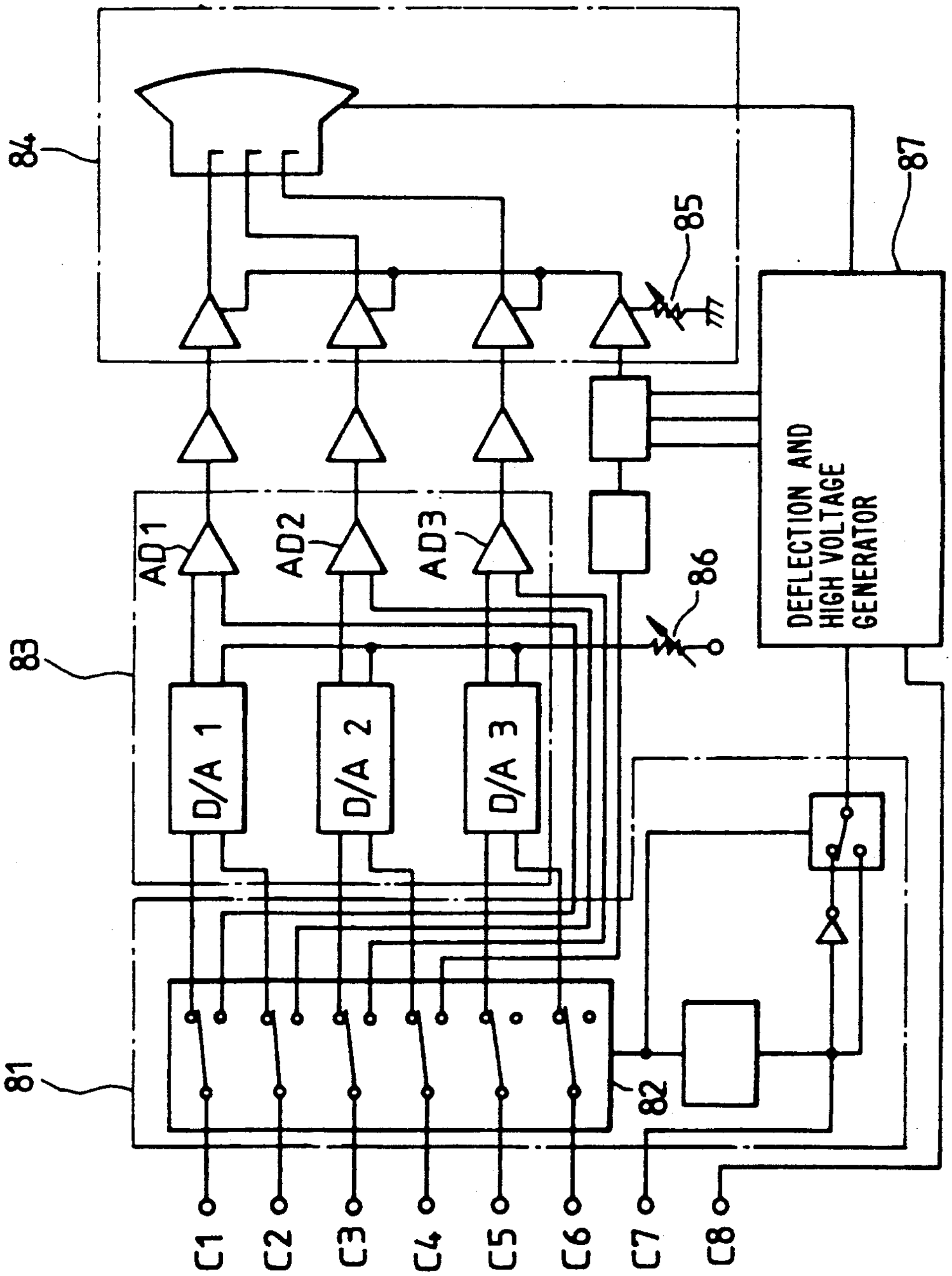
FIG. 1 (Prior Art)
FIG. 1 is a circuit diagram of a conventional color display circuit.
Figure 2:
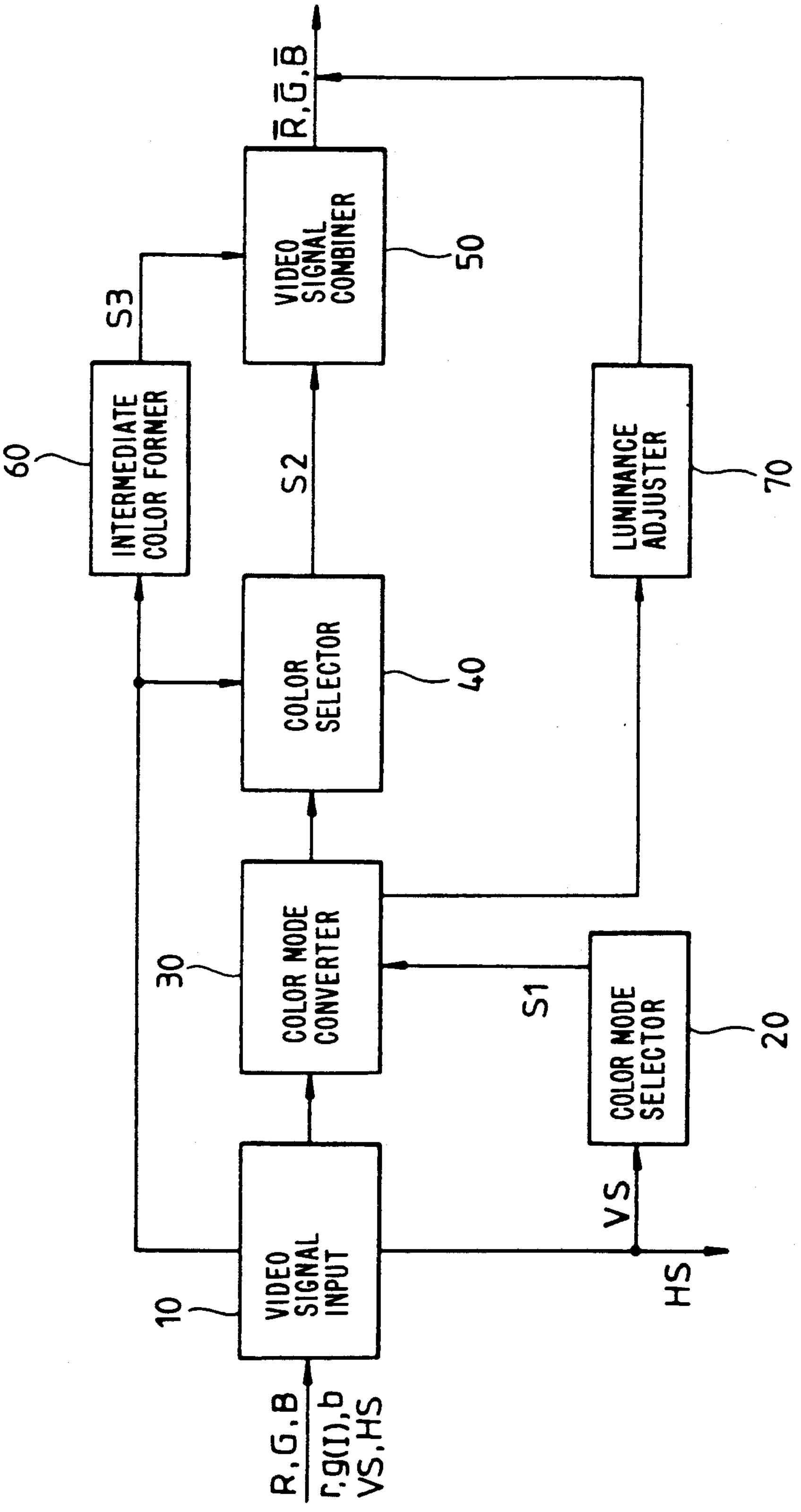
FIG. 2 is a block diagram of the color display circuit according to the present invention.

As shown in FIG. 2, the color display circuit according to the present invention comprises: a video signal input section 10 for receiving vertical and horizontal synchronizing signals, data of color information of predetermined number of bits and an intensity information for it outputted from a color generator of a computer (not shown) and the like; a color mode selecting section 20 for outputting color mode selecting signals S1 in accordance with the form of the vertical synchronizing signals VS inputted through the video signal inputting section 10; a color mode converting section 30 for selecting and outputting, based on the color mode, the intensity information inputted through the video signal inputting section 10 after being controlled by the color mode selecting signals S1 which are outputted from the color mode selecting section 20; a color selecting section 40 for selecting and outputting the color signals S2 corresponding to the respective colors after receipt of a color information inputted through the video signal inputting section 10 and after receipt of an intensity information which is selectively outputted from the color mode converting section 30; a video signal combining section 50 for outputting contol signals $\overline{R},\overline{G},\overline{B}$ in order to control a plurality of electron guns(not shown) through D/A conversions of the inputted color signals S2 which are selected by the color selecting section 40; an intermediate color forming section 60 for outputting intermediate color forming signals S3 to the video signal combining section 50 upon inputting of a color information for a particular intermediate color from the video signal input section 10; and a luminance adjusting section 70 for controlling the level of the electron gun controlling signals $\overline{R},\overline{G},\overline{B}$, outputted from the video signal combining section 50 when an intensity information I is inputted.

Figure 3:
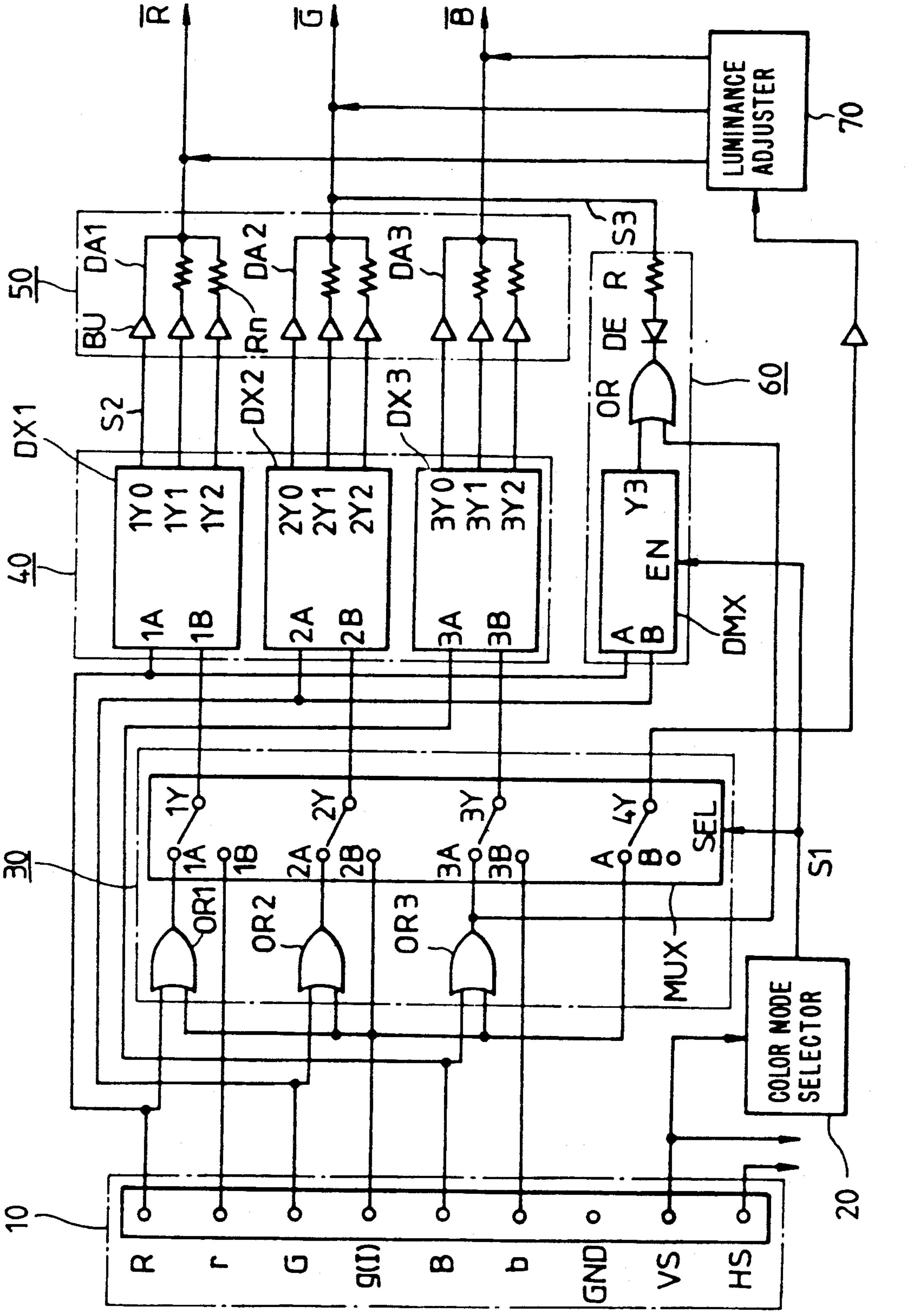
FIG. 3 is a schematic circuit showing an embodiment of the color display circuit according to the present invention.

FIG. 3 is a schematic circuit showing an embodiment of the present invention based on the block diagram of FIG. 2, and this drawing shows the circuit of the present invention applied to a color TTL monitor which is capable of displaying 16 color/64 colors.

The signal input section 10 receives horizontal synchronizing signals HS and vertical synchronizing signals VS, and color information date R,G,B and intensity information data r,g,b, I supplied from a color generator (not shown). The color information consists of a 3-bit information for red, green and blue colors, while the intensity information consists of an information I in the case of a 16-color mode, and consists of a three-bit information r.g.b in the case of a 64-color mode. Here, the intensity information I under the 16-color mode and the G intensity information g under a 64-color are let to share the input terminal.

Meanwhile, the vertical synchroizing signal VS has a frequency of 60 Hz, while the horizontal synchronizing signal HS has a frequency of 15.75 KHz in the case of a 16-color mode, and a frequency of 21.8 KHz in the case of 64-color mode. The increase of the frequency of the horizontal synchronizing signal HS in the case of a 64-color mode is for increasing the resolving power by increasing the picture elements(Pixel).

The color mode selecting section 20 outputs the color mode selecting signals S1 in accordance with the state of the vertical synchronizing signal VS inputted through the video signal inputting section 10. For example, if it is assumed that the inputted vertical synchronizing signal VS has a positive level in the case of a 16-color mode and a negative level under a 64-color mode, then a low or high color mode selecting signal S1 is outputted according to the above mentioned conditions. Such a constitution of the color mode selecting section 20 is same as that of Korean Utility Model Publication No. 85-1954, and therefore, no further detailed description will be presented.

The color mode converting section 30 consists of: first to third OR gates OR1, OR2, OR3 for combining the respective color information data R,G,B and the intensity information I of a 16-color mode; and a multiplexer MUX for selecting and outputting any one group of the combined signals of the respective OR gates OR1, OR2, OR3 and the intensity information data r,g,b of a 64-color mode in accordance with the color mode selecting signals S1 from the color mode selecting section 20. The intensity information I of a 16-color mode is inputted into a pair of input A,B of the umltiplexer MUX, so that the luminance adjusting section 70 can controlled only under a 16-color mode.

The color selecting section 40 consists of first to third demultiplexers DX1, DX2, DX3, and the respective demultiplexers DX1, DX2, DX3 receive through the input terminals 1A, 1B; 2A, 2B and 3A,3B the color information data R,G,B from the video signal inputting section 10, and the output signals (i.e., combined signals of the color information data R,G,B and the intensity information I in the case of a 16-color mode, and the intensity information data r,g,b in the case of a 64-color mode) from the color mode converting section 30 in order to multiplex them, so that the color signals S2 corresponding to the inputted signals can be outputted to output terminals 1Y0, 1Y1, 1Y2.

The video signal combining section 50 consists of first to third D/A converters DA1, DA2, DA3 for D/A converting the outputs of the respective demultiplexers DX1, DX2, DX3 of the color selecting section 40 after receipt of them. Each of the first to third D/A converters DA1, DA2, DA3 consists of a plurality of buffers BU and a ladder type resistance network Rn in such a manner that the inputted digital color signals are converted to step shaped analogue signals, and that electron gun controlling signals $\overline{R},\overline{G},\overline{B}$ are outputted through a video signal outputting section (not shown).

The intermediate color forming section 60 forms a brown color in the preferred embodiment of the present invention, and consists of: a demultiplexer DMX for demultiplexing the color information data R,G in the case of a 16-color mode after being controlled by the color mode selecting signal S1 of the color mode selecting section 20; an OR gate OR for combining the signals such as the intensity information I, the color information B and the output of the demultiplexer DMX; and a diode DE for being switched by an output of the OR gate OR and for stepping down the level of a control signal $\overline{G}$ of the video signal outputting section through a resistance R, the control signal $\overline{G}$ being to be supplied to the G electron gun.

The luminance adjusting section 70 has a constitution of a usual amplifier, and shifts up the levels of the control signals $\overline{R},\overline{G},\overline{B}$ to be supplied to the respective electron guns upon receipt of a high signal from an output terminal 4Y of the color mode converting section 30.

The color display circuit of the present invention constituted as above will now be described as to its operations for the respective modes.

First, the operation of the circuit of the present invention will be described referring to FIG. 4 for the case where the circuit of the present invention is operated under a 16-color mode.

The color information data R,G,B and the intensity information I are inputted to the input terminal of the video signal input section 10, and, under this condition, as the intensity information data r,b are not outputted, the section 10 lies in an open state. Meanwhile, the vertical synchronizing signal VS is inputted in a positive level and in 60 Hz, while the horizontal synchronizing signal HS is inputted in a frequency of 15.75 KHz.

If a positive vertical synchronizing signal VS is inputted into the color mode selecting section 20, then, in response to it, the color mode selecting section 20 outputs, for example, a low color mode selecting signal S1, and this output signal is supplied both to a selector terminal SEL of the multiplexer MUX of the color mode converting section 30 and to an enabling terminal EN of the demultiplexer DMX of the intermediate color forming section 60, thereby converting the mode of the circuit to a 16-color mode.

Figures 4A, 4B, 4C, 4D, 4E, 4F, 4G:
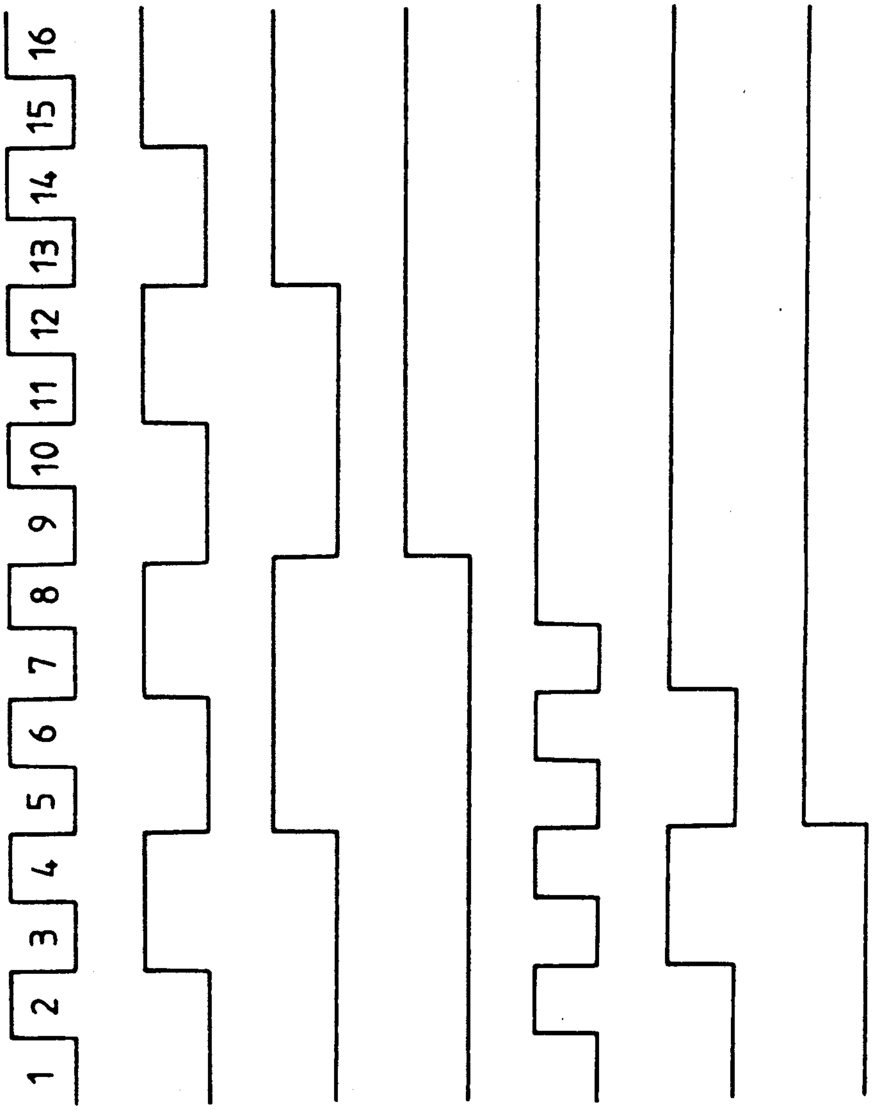
FIGS. 4(A)–4(H) are a graphic illustration of the input/output wave patterns for showing the operations when the circuit of FIG. 3 is operated under a 16-color mode.

The color information data R,G,B inputted into the color mode converting section 30 as shown in FIGS. 4A, 4B and 4C are combined with the intensity information I at the respective OR gates OR1, OR2, and OR3 as shown in FIG. 4D. The combined information data are inputted into the multiplexer MUX as shown in FIGS. 4E, 4F, and 4G, and the multiplexer MUX is shifted to a 16-color mode, thereby letting the inputted data be outputted in the same form. Further, the intensity information I is also outputted through an output terminal 4Y to the luminance adjusting section 70.

The color information data R,G,B inputted through the video signal inputting section 10 and the combined signals outputted from the color mode converting section 30 are all inputted into the color selecting section 40 to be multiplexed there, and the signals inputted into the input terminals 1A, 1B . . . of the respective demultiplexers DX1, DX2, DX3 are demultiplexed in an enabled state as shown in the following table as an example, before they are outputted through the output terminals 1Y0 1Y1, 1Y2, . . .

| Input | | Output | | | |
|---|---|---|---|---|---|
| A | B | Y0 | Y1 | Y2 | Y3 |
| L | L | L | H | H | H |
| H | L | H | L | H | H |
| L | H | H | H | L | H |
| H | H | H | H | H | L |

Figures 4H, 4I, 4J, 4K, 4L, 4M, 4N:
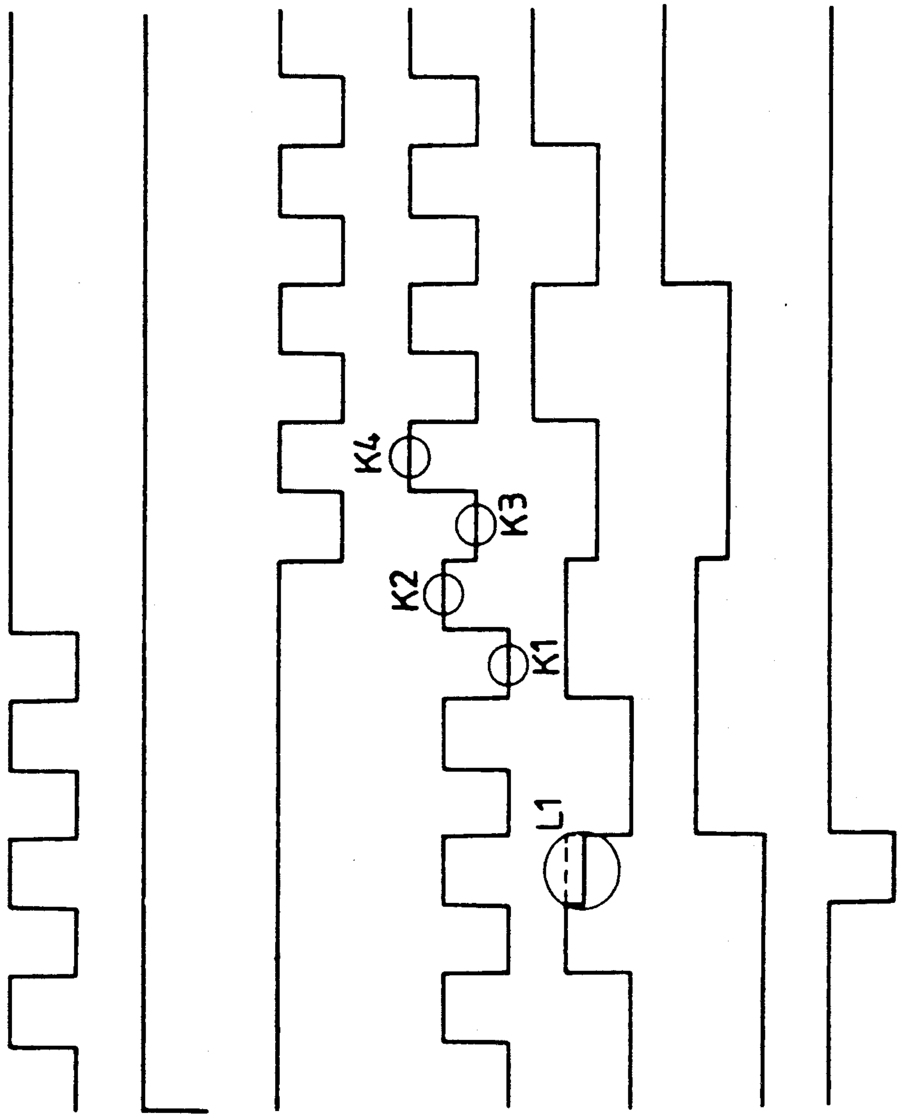

According to the operation based on the above table, for example, the color signals outputted from the output terminals 1Y0, 1Y1, 1Y2 of the first demultiplexer DX1 take the forms of FIGS. 4H, 4I, and 4J.

The color signals S2 of the color selecting section 40 are supplied to the video signal combining section 50 where they are D/A-converted. That is, the signals S2 are buffered by the buffer BU, are converted and combined to step shaped waves by the ladder type resistance networks Rn, and are outputted in the form of control signals $\overline{R}$,$\overline{G}$,$\overline{B}$ of the video signal output section (not shown) in order to control the respective electron guns.

If the intensity information I is inputted with a high level to the video signal input section 10, then the luminance adjusting section 70 steps up the respective control signals $\overline{R}$,$\overline{G}$,$\overline{B}$ to the predetermined level, so that the outputs of the respective electron guns are increased, thereby outputting bright colors.

Now, the operations of the intermediate color forming section 60 for the case where the color information data R,G,B,I are inputted in a combination of (1,1,0,0), i.e., for the case of forming a brown color will be described. In such a case, only when the color information as discriminated by the OR gate OR and the demultiplexer DMX operated based on the above table shows the above combination, the OR gate OR will output a "Low" (refer to FIG. 4N). Under such a condition, the diode DE shifts down to the required level the control signal $\overline{G}$ to be applied to the G electron gun, thereby letting a brown color be displayed.

To summarize the above described operations, the R,G,B electron gun controlling signals $\overline{R}$,$\overline{G}$,$\overline{B}$ outputted from the video signal combining section 50 take the step shaped analogue forms of FIGS. 4K, 4L and 4M.

In the case of FIG. 4K, for example, K1 corresponds to the case where the outputs of the first demultiplexer DX1 are "LOW", "HIGH", "HIGH", K2 corresponds to the case where the outputs are "HIGH", "HIGH", "HIGH", K3 corresponds to the case where the outputs are "HIGH", "HIGH", "LOW" and the luminance adjusting section 70 is turned on, and K4 corresponds to the case where the outputs are "HIGH", "HIGH", "HIGH" and the luminance adjusting section 70 is turned on. In FIG. 4L, L1 shows a state of the G electron gun control signal $\overline{G}$ shifted down to the required level by the intermediate color forming section 60, and the displayed color under such a condition will be brown.

The operation of the circuit of the present invention under a 64-color mode will be described below referring to FIG. 5.

The respective color information data R,G,B and the respective intensity information data r,g,b are inputted into the video signal input section 10, while the vertical synchronizing signals VS are supplied in negative 60 Hz and the horizontal synchronizing signals HS are supplied in 21.8 KHz. Under this condition, the color mode selecting section 20 outputs the color mode selecting signals S1, so that the color mode converting section 30 is shifted to a 64-color mode. Under a 64-color mode, the intermediate color forming section 60 and the luminance adjusting section 70 are turned over to a disabled state by the color mode selecting signals S1, thereby making them inoperable.

The color information and intensity information data R,r,G,g,B,b(refer to FIGS. 5A to 5F) which have been inputted to the video signal inputt section 10 are transferred to the color mode converting section 30, so that the color mode converting section 30 is turned over to a 64-color mode, and intensity information data r,g,b are outputted therefrom. The intensity information data r,g,b are inputted together with the color information data R,G,B into the color selecting section 40 where they are demultiplexed and outputted.

Figures 5A, 5B, 5C, 5D, 5E, 5F:
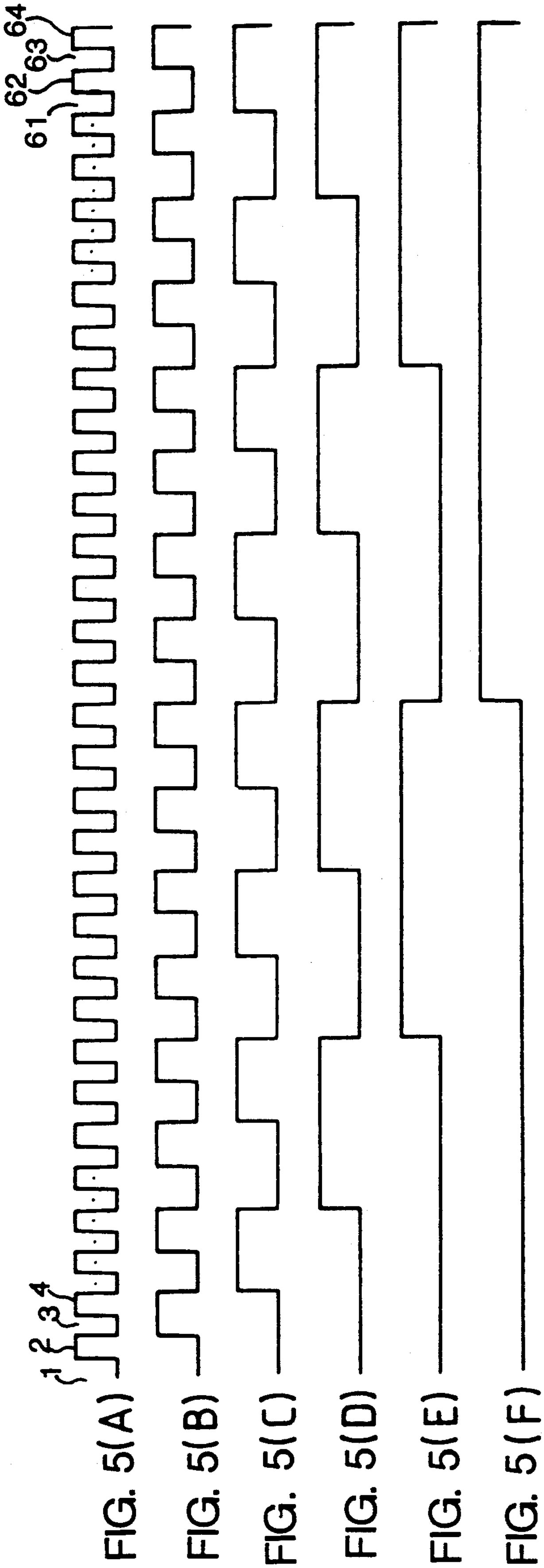
FIGS. 5(A)–5(I) are a graphic illustration of the input/output wave patterns for showing the operations when the circuit of FIG. 3 is operated under a 64-color mode.
Figure 5G:
Figure 5H:
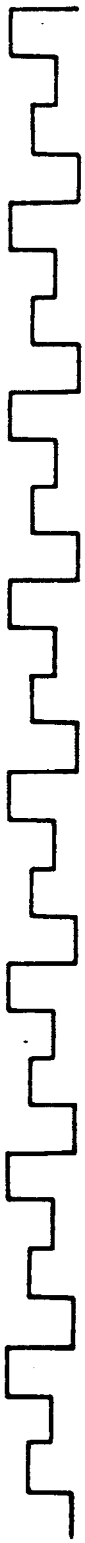
Figure 5I:
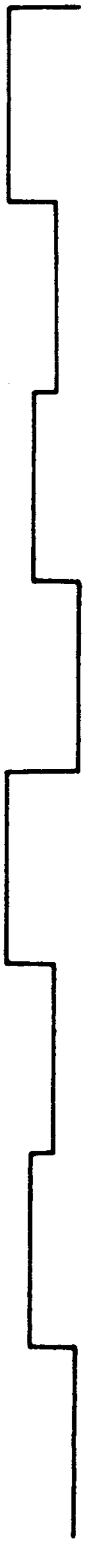

The outputs of the color selecting section 40 are supplied to the video signal combining section 50 where they are D/A-converted and combined, before they are outputted in the form of the control signals $\overline{R}$,$\overline{G}$,$\overline{B}$ for the R,G,B electron guns as shown in FIGS. 5G,5H and 5I.

As described above, the color display circuit according to the present invention is capable of operating 16-color/64-color modes within the same circuit, and therefore, not only the constitution of the circuit becomes simple, but also the forms of the signals processed through the circuit are same regardless of the mode. Further, according to the present invention, it has become possible to display intermediate colors which are not possible in the conventional techniques, thereby obtaining an advantage that a color display circuit capable of displaying rich colors is economically provided.

What is claimed is:

1. A color display circuit comprising:

a video signal input section for receiving color information data of a predetermined number of bits, intensity information data for them, and vertical and horizontal synchronizing signals;

a color mode selecting section for selectively outputting color mode selecting signals in accordance with said vertical synchronizing signals which are inputted through said video signal input section;

a color mode converting section for selecting and outputting the intensity information, after being controlled by said color mode selecting signals;

a color selecting section for selecting and outputting the corresponding color signals after receipt of the color information data through said video signal inputting section and after receipt of the intensity information data from said color mode converting section;

a video signal combining section for outputting control signals in order to control a plurality of electron guns after D/A conversions of the color signals;

an intermediate color forming section for letting said video signal combining section form an intermediate color upon inputting of an intermediate color information to said video signal input section; and a luminance adjusting section for controlling the level of the control signals which are outputted from said video signal combining section upon inputting of an intensity information to said video signal input section.

2. The color display circuit as claimed in claim 1, wherein said color mode selecting section consists of a plurality of demultiplexers capable of demultiplexing and outputting after receipt of the color information data and the outputs of said color mode converting section.

3. The color display circuit as claimed in claim 1, wherein said video signal combining section consists of a plurality of D/A converters, and each of said D/A converters consists of a plurality of buffers and a ladder type resistance network.

4. The color display circuit as claimed in claim 1, wherein said intermediate color forming circuit forms an intermediate color by controlling the levels of the electron gun controlling signals outputted from said video signal combining section when a certain color information data is inputted into said video signal input section.

5. The color display circuit as claimed in claim 1, wherein said color mode converting section consists of a multiplexer capable of selecting and outputting one mode signal after receipt of the groups of the intensity information of a 16-color mode and the intensity information of a 64-color mode.

6. The color display circuit as claimed in claim 5, wherein the intensity information data of a 16-color mode are inputted into said multiplexer in a state combined with the respective color information data.

* * * * *